S. DE W. CHAPMAN.
VALVE.
APPLICATION FILED SEPT. 16, 1914.
1,139,162. Patented May 11, 1915.
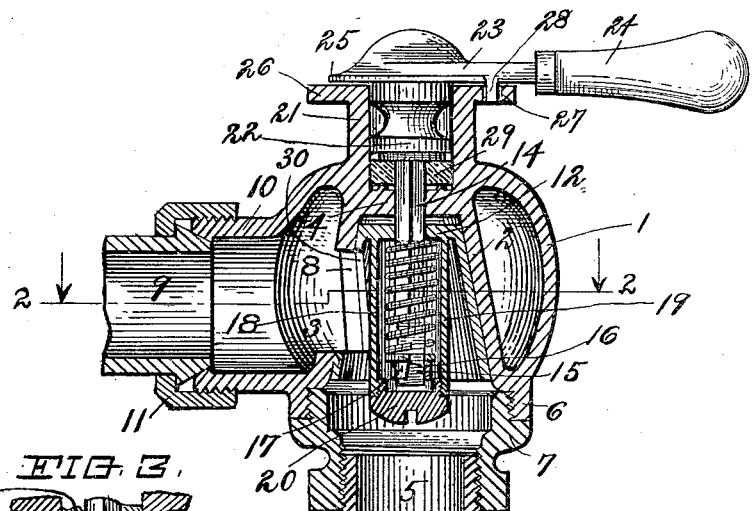
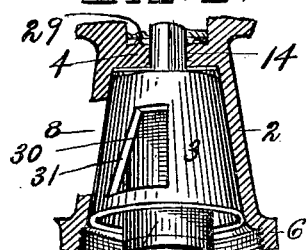
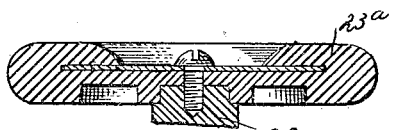
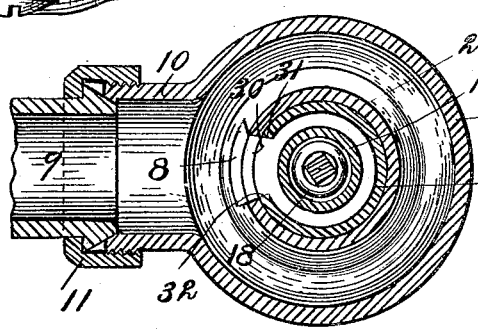
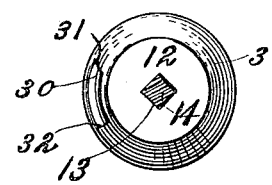
Witnesses:
J. C. Turner
Elfriede Schmidt.
Inventor.
Solomon DeWitt Chapman.
By Harry Frease
Attorney.

UNITED STATES PATENT OFFICE.

SOLOMON DE WITT CHAPMAN, OF CANTON, OHIO.

VALVE.

1,139,162.  Specification of Letters Patent.  Patented May 11, 1915.

Application filed September 16, 1914. Serial No. 862,010.

*To all whom it may concern:*

Be it known that I, SOLOMON DE WITT CHAPMAN, a citizen of the United States, residing at Canton, in the county of Stark and State of Ohio, have invented certain new and useful Improvements in Valves, of which the following is a specification.

The invention relates to a packless valve for use in radiator inlets and like places; and the object of the improvement is to provide a graduating valve which will close with the pressure, will be self-grinding, and in which the valve chamber is entirely separated or cut off from the stem chamber.

These objects are attained by the construction, mechanism and arrangement illustrated in the accompanying drawings, forming part hereof, in which:

Figure 1 is an elevation section of the valve, its case, and connecting parts; Fig. 2, a plan section of the same on line 2—2 of Fig. 1; Fig. 3, a perspective view of the valve showing the seat wall in section; Fig. 4, a section of a modified form of handle; and Fig. 5, an upper end view of the valve.

Similar numerals refer to similar parts throughout the drawings.

Within the globular case 1 is provided the conical wall 2 forming a seat for the conical valve 3; the upper and smaller end of the seat cavity being closed by the transverse wall 4, and the lower and larger end thereof being open to communicate with the discharge pipe 5 which is secured to the tubular extension 6 formed on the lower end of the case, as by means of the screw nipple 7.

The inlet port 8 is provided in one side of the seat wall, and communicates with the inlet pipe 9 connected to the tubular extension 10 formed on the side of the case, as by means of the union 11. The upper end of the valve 3 is closed by the transverse wall 12, in the center of which is provided the squares opening 13 for the squared stem 14 of the valve.

The valve stem 14 extends downward to or near the lower open end of the valve, and its lower end 15 is rounded and threaded, and is provided with the washer 16 and the screw nut 17, between which washer and the wall 12 closing the upper end of the valve is located the compression spring 18.

All these parts are inclosed within the tubular wall 19 which depends from the transverse wall 12 forming the top of the valve, and the lower end of this tubular wall is closed by the cap 20 screwed therein, thus shutting off all communication between the inside of the valve and the stem aperture 13 in the transverse wall closing its upper end.

The valve stem 14 extends upward through the central aperture 4ª in the transverse wall across the upper end of the valve seat into and through the tubular stem 21 formed on the upper end of the case; and the upper end of the stem is preferably provided with the cylindric head 22 neatly fitting in the tubular stem of the case, and integrally therewith may be formed the rotating lever 23 having the handle 24 on one end and the pointer 25 on the other end.

The dial flange 26 is preferably provided on the upper end of the case stem, on one side of which may be provided suitable graduations (not shown) for the pointer 25, and in the other side may be provided the arc slot 27 for the stop pin 28 depending from the lever 23, all in a manner well known in this art.

A suitable washer 29 is provided around the valve stem 14 between the transverse wall 4 at the top of the valve seat and the cylindric head 22 on the upper end of the valve stem; and the parts are so arranged and proportioned that this washer forms a seat for the head of the stem to hold the lever thereon freely above the dial flange, and in this relation of the parts the screw nut on the lower end of the stem may be adjusted to firmly seat the conical valve in the conical wall of the case.

The port 30 is provided in the side wall of the valve and corresponds to the port 8 in the seat wall, which valve port is arranged to register with the seat port when the lever 23 is rotated into open position, as shown in Figs. 1 and 2, and to be shut off by the seat wall when the valve is rotated into closed position, as shown in Fig. 3. One side 31 of the valve port is preferably inclined, so that when rotated past the straight edge 32 of the seat port the inclined edge will serve to more gradually open and close the valve as the acute angle side of the opening is uncovered or closed by the straight side of the case port. And finally, the wheel handle 23ª may be substituted on the stem head 22 in place of the lever handle 23, as shown in Fig. 4.

I claim:

A valve including a globular case having a conical wall therein forming a valve seat with a cross wall at the smaller end and a tubular wall extending therefrom, a conical valve seated in the conical wall and having a cross wall at its smaller end, a stem extending through the cross walls with a cylindric head on one end in the tubular wall and an adjustable nut on the other end, said stem being engaged with the valve wall, a washer between the stem head and the adjacent cross wall, a compression spring between the nut and the valve wall, and a tubular wall around the spring and stem connected at one end with the valve wall and having a cap closing its other end.

SOLOMON DE WITT CHAPMAN.

Witnesses:
 EARL C. CARLSON,
 LOUISE M. CORBY.

Copies of this patent may be obtained for five cents each, by addressing the "Commissioner of Patents, Washington, D. C."